US012081997B2

(12) United States Patent
Taneja et al.

(10) Patent No.: US 12,081,997 B2
(45) Date of Patent: *Sep. 3, 2024

(54) PERFORMANCE ASSURANCE AND OPTIMIZATION FOR GAA AND PAL DEVICES IN A CBRS NETWORK FOR PRIVATE ENTERPRISE ENVIRONMENT

(71) Applicant: Cisco Technology, Inc., San Jose, CA (US)

(72) Inventors: Mukesh Taneja, Bangalore (IN); Indermeet Singh Gandhi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,922

(22) Filed: Jul. 20, 2023

(65) Prior Publication Data

US 2023/0370857 A1 Nov. 16, 2023

Related U.S. Application Data

(63) Continuation of application No. 17/460,084, filed on Aug. 27, 2021, now Pat. No. 11,751,067, which is a
(Continued)

(51) Int. Cl.
*H04W 24/00* (2009.01)
*G06N 20/00* (2019.01)
(Continued)

(52) U.S. Cl.
CPC ............ *H04W 16/16* (2013.01); *G06N 20/00* (2019.01); *H04W 24/08* (2013.01); *H04W 72/541* (2023.01); *H04W 72/542* (2023.01)

(58) Field of Classification Search
CPC .................. H04W 16/16; H04W 24/08; H04W 72/082; H04W 72/085; G06N 20/00
(Continued)

(56) References Cited

U.S. PATENT DOCUMENTS

| 10,271,351 | B1 | 4/2019 | Wang | |
|---|---|---|---|---|
| 11,122,440 | B2* | 9/2021 | Taneja | ................. H04W 72/541 |
| 11,751,067 | B2* | 9/2023 | Taneja | ................... G06N 20/00 370/252 |

(Continued)

FOREIGN PATENT DOCUMENTS

WO 2019066882 A1 4/2019

OTHER PUBLICATIONS

Parvez I., et al., "CBRS Spectrum Sharing Between LTE-U and WiFi: A Multiarmed Bandit Approach," Mobile Information Systems, Jul. 19, 2016, vol. 2016, Article ID 5909801, pp. 1-13.

*Primary Examiner* — Maharishi V Khirodhar
(74) *Attorney, Agent, or Firm* — Polsinelli P.C.

(57) ABSTRACT

The disclosed technology relates to a process of dynamically assigning operational parameters for access points within a CBRS (Citizen Broadband Radio Service) network. In particular, the disclosed technology monitors for and detects interference between nearby access points and user equipment devices that may belong to the same enterprise or to different enterprises. Machine learning processes are used to revise the operational parameters that were initially assigned by the Spectrum Access System (SAS). These processes are also used to suggest an updated set of operational parameters to the SAS for the access points. The dynamic assignment reduces interference experienced by the access point with respect to nearby other access points and/or nearby other user equipment. The dynamic assignment aims to improve a quality of communication between the access point and its associated user equipment.

20 Claims, 16 Drawing Sheets

Related U.S. Application Data continuation of application No. 16/565,731, filed on Sep. 10, 2019, now Pat. No. 11,122,440.

(51) Int. Cl.
| | |
|---|---|
| *H04L 43/0852* | (2022.01) |
| *H04L 43/50* | (2022.01) |
| *H04W 16/16* | (2009.01) |
| *H04W 24/08* | (2009.01) |
| *H04W 72/541* | (2023.01) |
| *H04W 72/542* | (2023.01) |

(58) Field of Classification Search
USPC .......................................................... 370/252
See application file for complete search history.

(56) References Cited

U.S. PATENT DOCUMENTS

| | | |
|---|---|---|
| 2017/0251484 A1 | 8/2017 | Negus et al. |
| 2018/0132111 A1 | 5/2018 | Mueck et al. |
| 2018/0376342 A1 | 12/2018 | Macmullan et al. |
| 2019/0028182 A1 | 1/2019 | Smyth et al. |
| 2019/0058999 A1 | 2/2019 | Gunasekara et al. |
| 2019/0120969 A1 | 4/2019 | Hamzeh et al. |
| 2019/0141713 A1 | 5/2019 | Cimpu et al. |
| 2019/0394678 A1* | 12/2019 | Syed .................. H04W 36/165 |
| 2020/0059931 A1 | 2/2020 | Hannan et al. |
| 2020/0107210 A1 | 4/2020 | Wu et al. |
| 2020/0252808 A1 | 8/2020 | Zhao et al. |
| 2020/0275457 A1 | 8/2020 | Hmimy |
| 2020/0344766 A1* | 10/2020 | Furuichi .................. H04L 5/14 |
| 2021/0306885 A1* | 9/2021 | Hou .................... H04W 52/383 |

* cited by examiner

PERFORMANCE ASSURANCE AND OPTIMIZATION FOR GAA AND PAL DEVICES IN A CBRS NETWORK FOR PRIVATE ENTERPRISE ENVIRONMENT

CROSS-REFERENCE TO RELATED APPLICATION

This application is a continuation of is a Continuation of, and claims priority to, U.S. patent application Ser. No. 17/460,084 entitled PERFORMANCE ASSURANCE AND OPTIMIZATION FOR GAA AND PAL DEVICES IN A CBRS NETWORK FOR PRIVATE ENTERPRISE ENVIRONMENT filed Aug. 27, 2021, which is a continuation of U.S. Non-Provisional patent application Ser. No. 16/565,731, filed on Sep. 10, 2019, the full disclosures of which are hereby expressly incorporated by reference in their entireties.

TECHNICAL FIELD

The subject matter of this disclosure relates in general to computing networks, and more specifically to performance assurance and optimization for generalized authorized access (GAA) and priority access license (PAL) devices in a CBRS network for private enterprise environments.

BACKGROUND

The Citizen Broadcast Radio Service (CBRS) is a 150 MHz wide broadcast band in the 3550-3700 MHz frequency range in the United States. Some of this spectrum is used by the United States government for their radar systems. When portions of the spectrum are not in use, those portions can be made available for use by other entities. In 2017, the Federal Communications Commission (FCC) completed a process to establish rules for commercial use of the band. CBRS style shared spectrum in some other bands is also being planned in Europe and some other parts of the world.

The CBRS is governed by a three-tiered spectrum authorization framework (incumbent access, priority access, general authorized access) to accommodate a variety of commercial uses on a shared basis with incumbent federal and non-federal users of the band. Incumbent access users include authorized federal and grandfathered fixed satellite service users. Priority access consists of priority access licenses assigned to competitive bidding within the band. Lastly, general authorized access is licensed-by-rule to permit open, flexible access to any portion of the band not assigned to any of the two higher tiers with respect to the widest possible group of potential users. The access and operations for the band across the three different tiers are managed by a dynamic spectrum access system (SAS).

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

BRIEF DESCRIPTION OF EXAMPLE EMBODIMENTS

Figure 1:
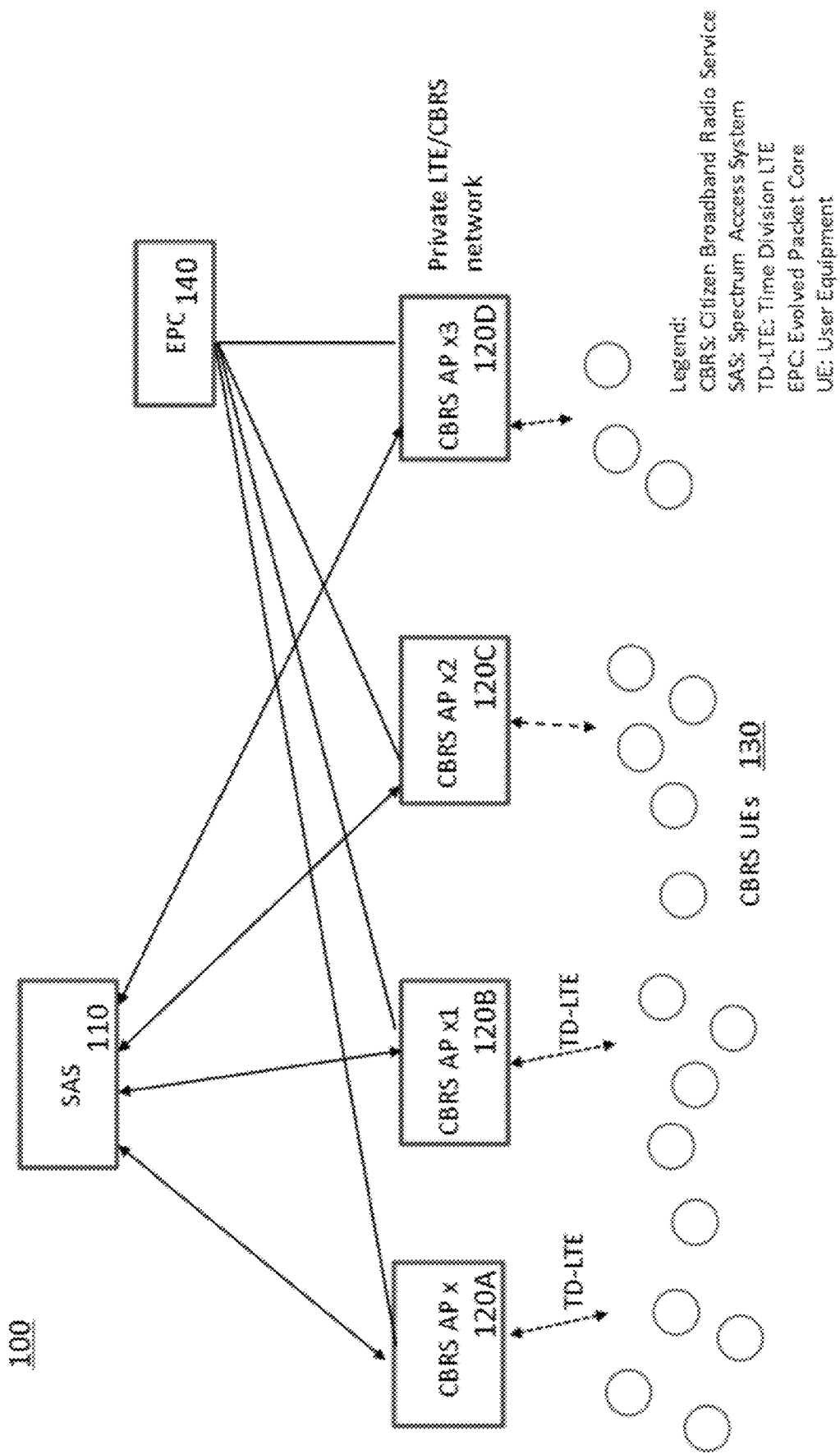
FIG. 1 illustrates an example deployment of CBRS network.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are computer-implemented methods, computer-readable media, and systems for dynamically assigning operational parameters for access points within a CBRS (Citizen Broadband Radio Service) network. The dynamic assignments are performed by initially assigning a set of operational parameters for an access point within the CBRS network. The set of operational parameters define operational constraints for the access point and its associated user equipment within the CBRS network. Next, detection of interference between the access point, user equipment, and other nearby devices within the CBRS network is performed. Afterwards, revisions of the set of operational parameters for the access point are performed. The revised set of operational parameters satisfies the operational constraints defined by the initially assigned set of operational parameters. Last, a step of identifying whether the interference at the access point has decreased subsequent to implementation of the revised set of operational parameters at the access point is performed.

In an embodiment, the set of operational parameters is initially assigned by a SAS (Spectrum Access System) that manages the CBRS network. The set of operational parameters includes a CBRS channel and a maximum effective isotropic radiated power (EIRP) that the access point can use for the CBRS channel.

Furthermore, the detecting of the interference within the CBRS network comprises instructing the user equipment to calculate a channel quality indicator. The channel quality indicator quantifies a quality of communication between the access point and the user equipment.

In another embodiment, the computer-implemented methods, computer-readable media, and systems also include steps for transmitting the initially assigned set of operational parameters for the access point to a computing device programmed to manage revised assignments of the operational parameters of the access points within the CBRS network, generating (at the computing device) the revised set of operational parameters that reduces interference detected at the access point, and transmitting to the access point the revised set of operational parameters. The access point implements the revised set of operational parameters to reduce interference between the access point and other access points within the CBRS network. In a further embodiment, information is provided from the access point to the one or more computing devices where the information pertains to network topology, available channels and operating parameters associated with other access points and/or user equipment, detected interference, traffic load, building layout, and channel quality indicators. The provided information between the access point and the computing devices (described above) is also relied on when generating the revised set of operational parameters.

In another embodiment, generating the revised set of operational parameters is performed using a machine learning process. The machine learning process outputs a machine learned model that corresponds to the revised set of operational parameters.

In another embodiment, the computer-implemented methods, computer-readable media, and systems also receives user feedback regarding performance of the user equipment associated with the access point within the CBRS network. The user feedback informs whether a current set of operational parameters assigned to the access point should be modified.

In various embodiments, the interference can pertain to interference between nearby access points within the same enterprise. Interference between nearby access points belonging to two or more different enterprises is also possible.

Furthermore, other embodiments cover the revising of the set of operational parameters for the access point that include defining periods of time when nearby access points are operational. The set of operational parameters are revised so that nearby access points do not operate at the same time using the same portion of an assigned broadcast band.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present disclosure covers a proposed solution for providing dynamic assignments of operating parameters for devices in a CBRS (Citizen Broadband Radio Service) network. In particular, the devices are associated with generalized authorized access (GAA) and priority access license (PAL) devices used in private enterprise environment. The Spectrum Access System (SAS) is responsible for assigning different users (e.g., enterprise access points, also referred to as CBRS Devices or CBSDs) to different channels or frequency bands (within the CBRS spectrum) as well as an allowed frequency and power that each access point can operate at. However, the SAS may not be aware of the numbers and locations of end users associated with each access point. As such, one set of access point and end users may produce interference for other nearby access points and end users (within the same enterprise as well as between nearby enterprises) that would negatively affect the quality of service of those access points and end users. The present technology monitors for and detects the interference between nearby access points and uses machine learning in order to dynamically assign/re-assign the access points to different CBRS channels (i.e. different frequencies). In addition, the present technology is also capable of dynamically determining a maximum effective isotropic radiated power (or EIRP) that the end user can use while transmitting data (within the allotted level assigned by the SAS). The maximum EIRP influences the maximum transmit power that a wireless device (such as an access point) can use. By controlling the maximum transmit power, the present technology can also mitigate interference caused by the transmission on the neighboring devices. The dynamic assignment of both the CBRS channel and the maximum EIRP can minimize the impact or removes the interference experienced by the access points from other nearby access points. Further details regarding the subject technology will be provided below.

FIG. 1 illustrates an example deployment of a CBRS network 100. The CBRS network 100 comprises the Spectrum Access System (SAS) 110 that is used to inform each of the access points 120A-120D how they should operate at a given point in time (e.g., what frequency band to use, what channel to use, how much power to consume while transmitting). The access points 120A-120D may be part of a single enterprise (e.g. 120A and 120B as being part of the same enterprise 1) or separate enterprises (e.g., 120C and 120D being part of different enterprises 2 and 3, respectively). These CBRS access points or CBRS base stations are also referred to as CBSDs (i.e. CBRS Devices) in the specification.

Any number of user equipment 130 can be associated with the respective access points 120A-120D. The user equipment 130 associated with each respective access point 120A-120D may include various computing devices such as mobile devices, laptops, and desktops that connect with the access points 120. Each user equipment 130 would be assigned restrictions on how to operate (e.g., what channel to use) based on the allotted constraints provided to the respective access point 120A-120D from the SAS 110.

An evolved packet core (EPC) 140 can also be deployed within the CBRS network 100. The EPC 140 can provide a variety of different functions for the CBRS network 100. For example, the EPC 140 can manage session states, authenticate, and manage communication associated with access points and/or user equipment within the CBRS network. The EPC 140 can also be used to route communications (e.g., data packets), manage quality of service (QoS), and provide deep packet inspection (DPI) functionality within the CBRS network.

Figure 2:
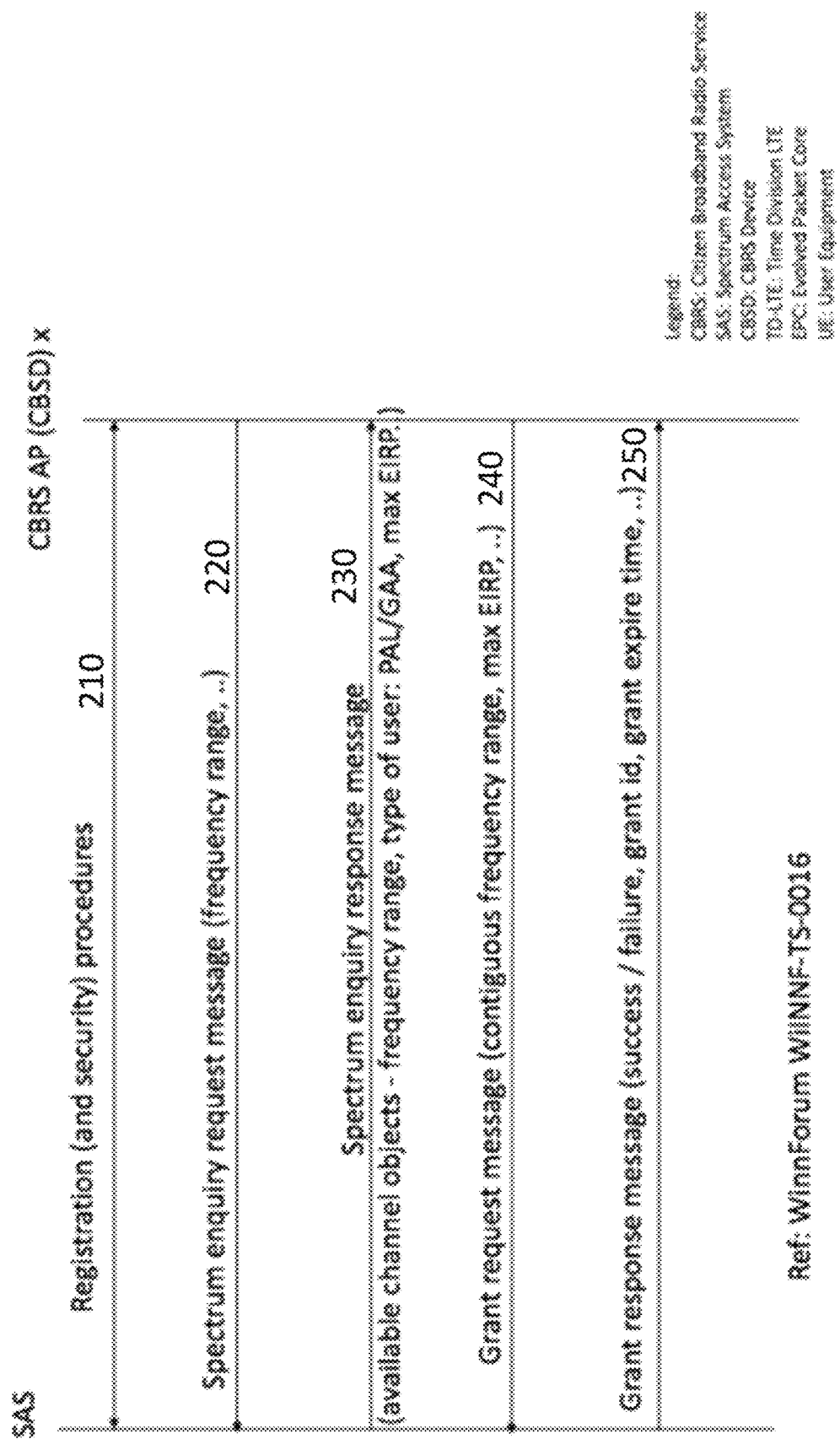
FIG. 2 illustrates a flow diagram showing the interactions of the SAS with the access points.

FIG. 2 illustrates a flow diagram showing the interactions of the SAS with the access points. In particular, the flow diagram illustrates the interactions between the SAS and the CBSDs (or access points) associated with establishing how each of the access points would operate within the overall CBRS network as illustrated in FIG. 1. In step 210, registration and security procedures are performed. The registration and security procedures may be used to identify the type of user and what tier they are associated with. Specifically, the present disclosure will be applicable for both GAA and PAL devices. In step 220, the access points can send a request to the SAS regarding operational parameters that the access points would like to use. For example, the access points may provide preferences regarding the CBRS channel (e.g., channel id and associated frequency) and maximum effective isotropic radiated power (EIRP) that the access point may wish to use for that channel. The SAS can then check to see if the resources associated with the preferred CBRS channels (as indicated in the request from the access points) are available.

In step 230, the SAS provides a response that instructs the access points how it should operate. In particular, the SAS (after reviewing the available information about other access points and what portions of the broadcast band is currently in use) can provide the assigned broadcast band for the access point to operate in based on what is available. Furthermore, the SAS can also provide other constraints on the access points in connection with the assigned CBRS channels (e.g., frequency, maximum effective isotropic radiated power).

In step 240, the access points can provide to the SAS the parameters (e.g., CBRS channel, maximum EIRP) that the access point intends to use for its transmission of messages in connection with the available CBRS channels indicated by the SAS. The SAS can then provide a response in step 25 indicating whether the messages that will be transmitted by the access points are appropriate given the resources that SAS can assign to these CBSDs (or access points). Furthermore, the SAS can provide additional information in step 250 to the access point related to specific messages sent from the access point such as a notification of granted access/allocation (allowing the access point to proceed with the transmission of the message using the broadcast band) and a duration for that granted access/allocation.

With the above deployment (as illustrated in FIG. 1) and the corresponding steps the SAS uses for assigning the access points to different CBRS channels and operational parameters (as illustrated in FIG. 2), some issues may arise with respect to interference between nearby access points and/or user equipment. The interference arises, for example, when access points and/or user equipment operate in overlapping channels (e.g., in multi-tenant buildings) Such a situation may occur when different SAS (belonging to different SAS providers) assign different nearby enterprises to the same CBRS channels (or broadcast bands). It is also possible that the assignment can occur within the same SAS as well. Interference can also be caused when access points use higher than allotted power assigned by the SAS. Transmission from user equipment can also cause interference to neighboring devices operating in the same CBRS channel.

Because an enterprise may not know how the SAS may assign what portion of the CBRS spectrum to use, this also causes problems on the side of the enterprise trying to do proper network planning. The network planning may not be possible as enterprises would not have any idea about what part of the CBRS spectrum (and associated parameters such as maximum effective isotropic radiated power that a CBSD can use while transmitting data) that the enterprise (and its access points) may be assigned at any given time. An improvement to the CBRS network (as illustrated in FIG. 1) will be described next.

Figure 3:
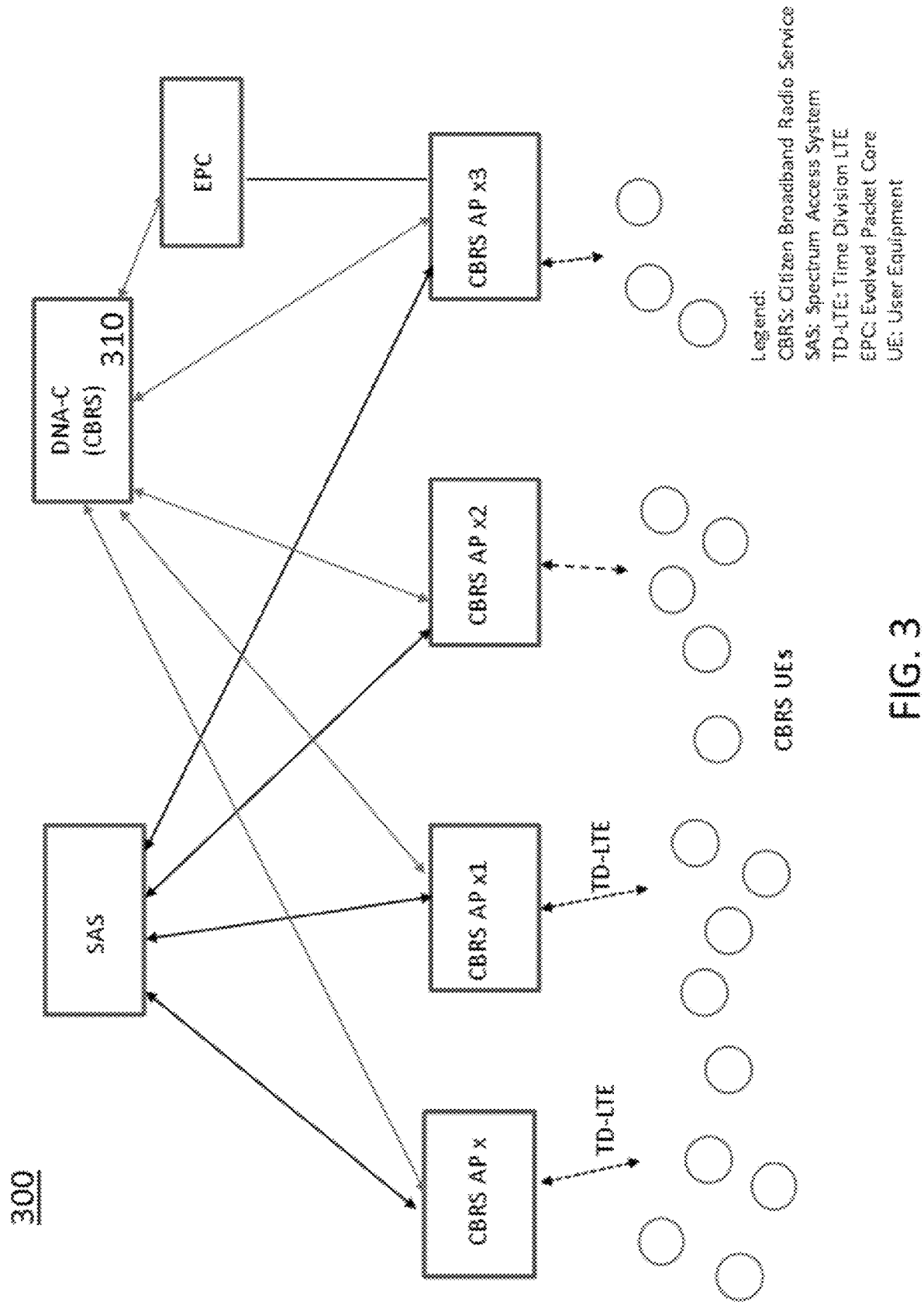
FIG. 3 illustrates another deployment of the CBRS network in accordance with various embodiments of the subject technology.

FIG. 3 illustrates another deployment of the CBRS network 300 in accordance with various embodiments of the subject technology. In particular, the CBRS network 300 illustrated in FIG. 3 improves on the CBRS network illustrated in FIG. 1 with the inclusion of the digital network architecture center (DNA-C) 310.

The DNA-C 310 will be used to further manage each of the access points of an enterprise within the CBRS network 300. In particular, the DNA-C 310 will 1) obtain the assignments of each of the access points provided by the SAS, 2) monitor performance of each of the access points and associated user equipment devices to detect when interference is present, 3) determine different parameters to assign to one or more of the access points when interference is detected, and 4) dynamically re-assign the operational parameters of the access points to minimize and/or eliminate the detected interference. In this way, the DNA-C 310 can resolve issues of interference between access points and/or user equipment that the SAS may not be able to account for.

Figure 4:
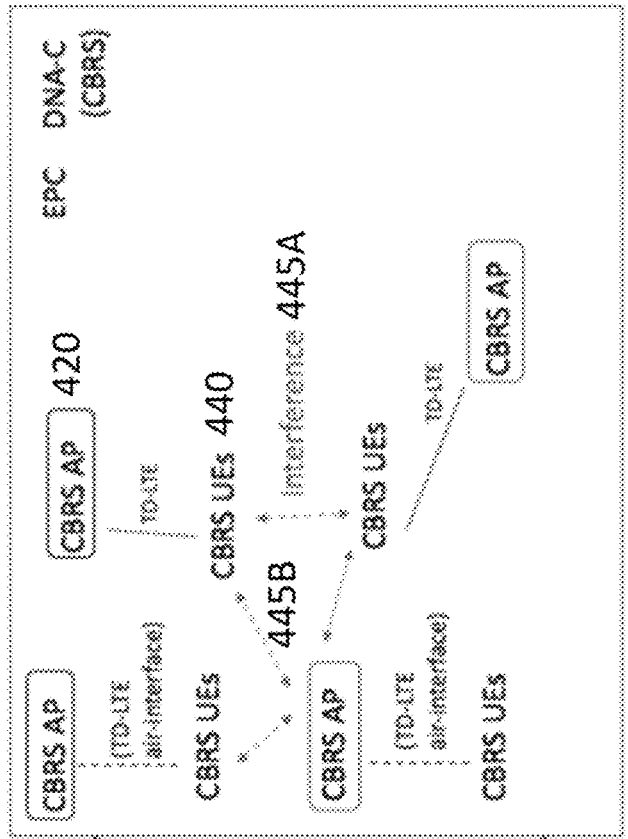
FIG. 4 illustrates an intra-enterprise interference scenario.

FIG. 4 illustrates an intra-enterprise interference scenario 400. In this figure, the SAS 410 may provide operational parameters for each of the access points 420 associated with a single enterprise (Enterprise A) 430. Because each of the access points 420 within the enterprise assign their associated user equipment 440 with corresponding operational parameters to use (e.g., frequency, power, broadcast band), the SAS 410 is not aware of the number of user equipment and/or the proximity of the user equipment within the enterprise. Therefore, interference can be caused by the user equipment 440 with respect to other nearby user equipment 445A or with other nearby access points 445B.

Figure 5:
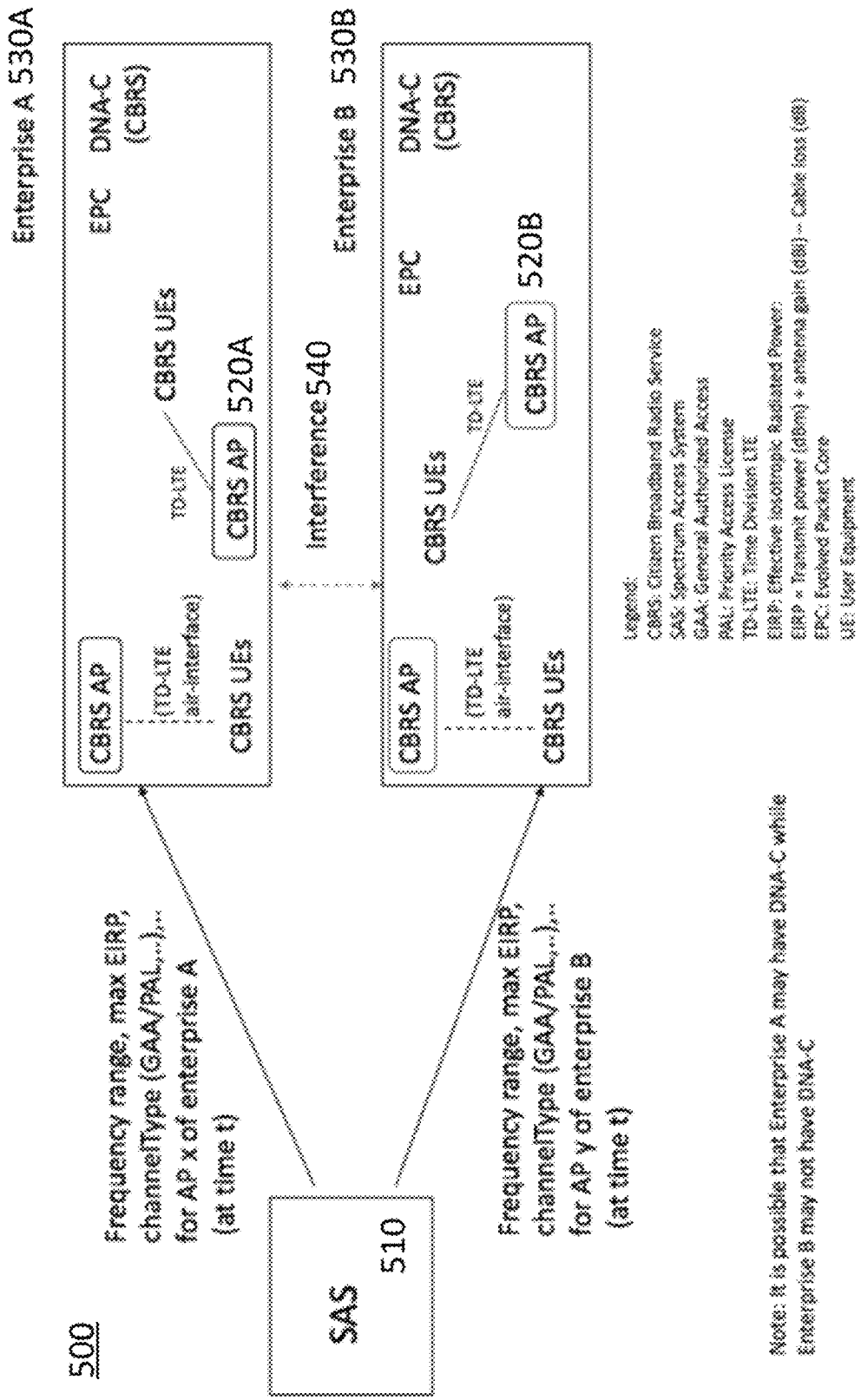
FIG. 5 illustrates an inter-enterprise interference scenario.

FIG. 5 illustrates an inter-enterprise interference scenario 500. In this situation, the SAS 510 may provide operational parameters for each of the access points 520A and 520B associated with at least two different enterprises (e.g., Enterprise A 530A and Enterprise B 530B). However, in this scenario, the SAS 510 may not be aware of the relative locations and building maps of each of the two different enterprises 530A and 530B (e.g. number of floors, height of each floor etc.). The SAS 510 is also not aware of the location of user equipment in different enterprises. Therefore, based on the provided operational parameters provided to each enterprise, the interference 540 between the enterprises may be caused when access points and/or user equipment of each enterprise operate nearby each other.

Figure 6:
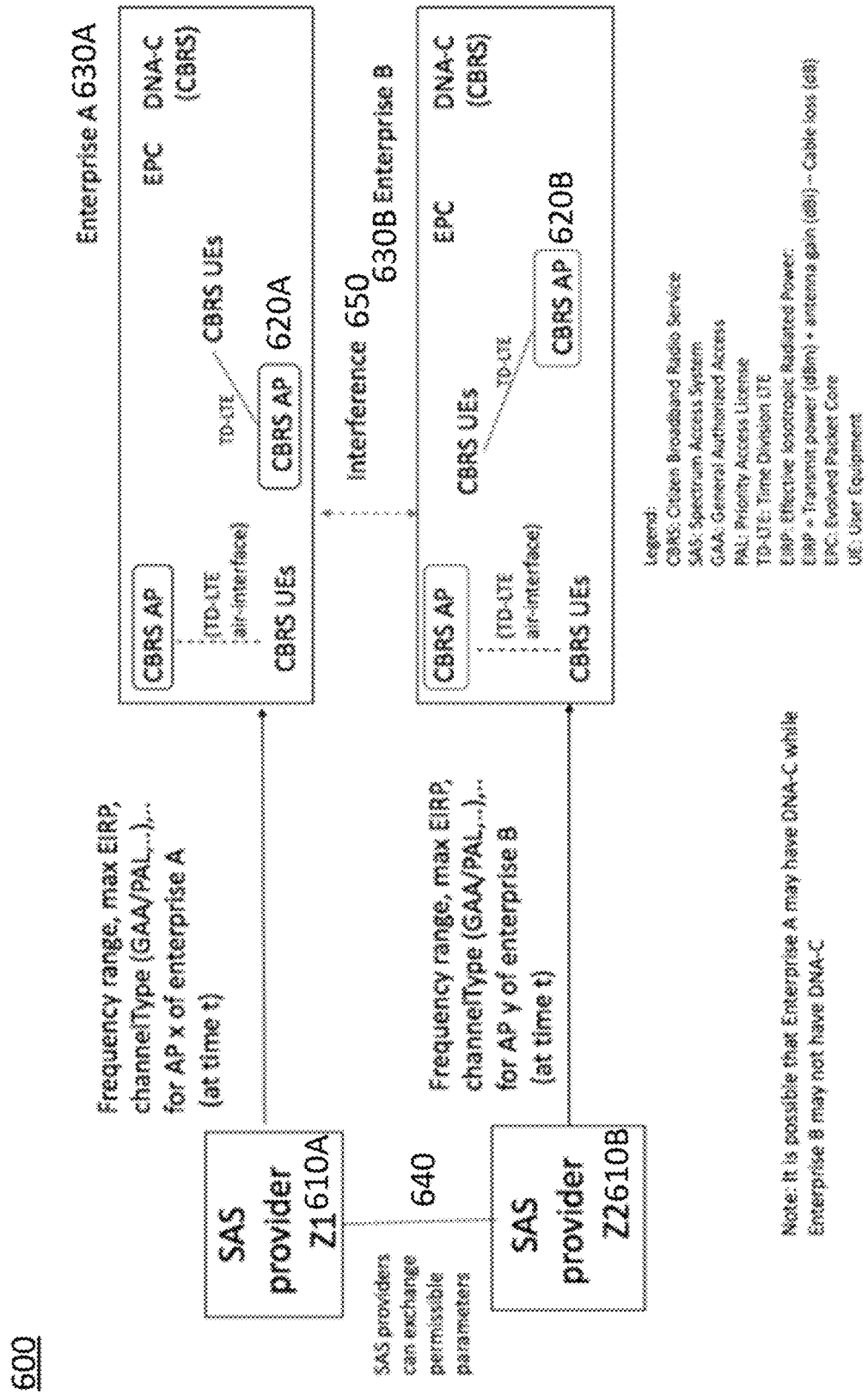
FIG. 6 illustrates another inter-enterprise interference scenario.

FIG. 6 illustrates another inter-enterprise interference scenario 600. In particular two different SAS 610A and 610B may be used to provide operational parameters for each of the access points 620A and 620B associated with different enterprises (e.g., SAS provider Z1 provides parameters to Enterprise A 630A while SAS provider Z2 provides parameters to Enterprise B 630B).

Information (e.g., operational parameters) regarding what access points 620A and 620B of the enterprises 630A and 630B, respectively are assigned by each of the SAS 610A and 610B can be shared between communication between the two SAS 640. However, other information such as the locations and building maps of the enterprises 630A, 630B and the location of user equipment of the enterprises may be unknown. Similar to the scenario in FIG. 5, interference 650 may be caused when the access points and/or user equipment of each enterprise operate nearby each other.

Figure 7A:
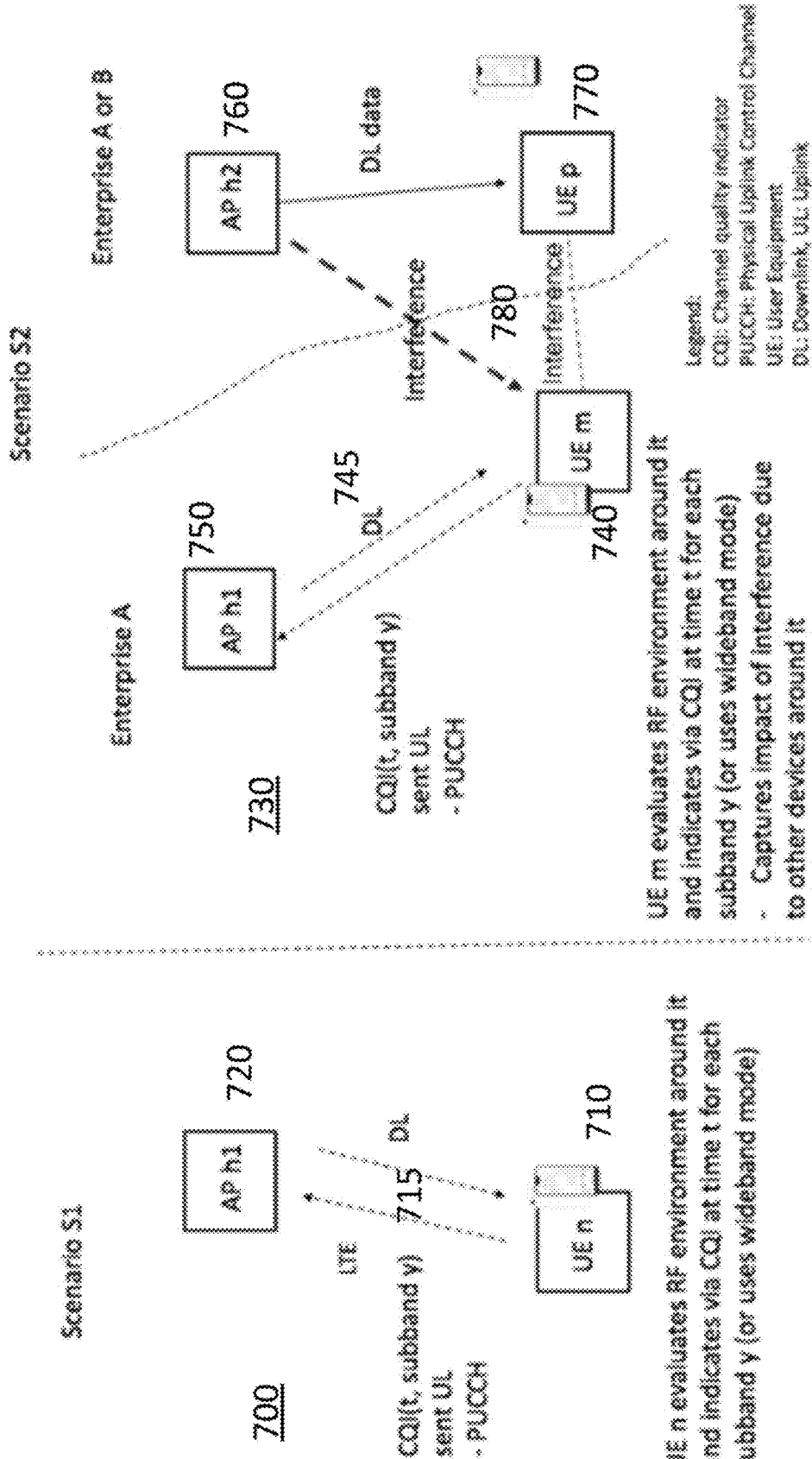
FIG. 7A illustrates evaluation of channel quality indicator between access points and user equipment in accordance with various embodiments of the subject technology.

FIG. 7A illustrates evaluation of channel quality indicator between access points and user equipment in accordance with various embodiments of the subject technology. In particular, an evaluation of the channel quality indicator (CQI) will be used to identify whether interference is affecting the quality/performance of the access points and/or user equipment. In an embodiment, if the performance as indicated by the channel quality indicator is below a pre-determined threshold or the interference level is above a pre-determined threshold, instructions may be sent to the DNA-C to determine new operational parameters for the affected access points and/or user equipment in order to minimize or eliminate the detected interference.

In a first scenario 700, the user equipment 710 will evaluate the quality of the communication channel 715 between the user equipment 710 and the associated access point 720. Ideally, this evaluation performed by the user equipment 710 will characterize the quality of the communication between the user equipment 710 and the access point 720 when no interference is present. If the quality of the performance of the communication channel 715 drops below a pre-determined threshold (for example, based on an earlier evaluation), this can be used to indicate that some interference is present and is negatively affecting the communication between the user equipment 710 and the access point 720. The evaluation can be performed by the user equipment 710 at pre-determined periods of time (or at pre-defined frequencies).

In a second scenario 730, the user equipment 740 may similarly evaluate the quality of the communication channel 745 between the user equipment 740 and the associated access point 750. However, in the second scenario 730, interference 780 from other access points 760 and/or other user equipment 770 is detected at the user equipment 740. The interference coming from the other access points 760 and/or other user equipment 770 may be associated with the same enterprise (or different enterprise) as the access point 750 and user equipment 740.

The detection of the interference by the user equipment 740 can be based on the evaluation of the channel quality indicator between the access point 750 and the user equipment 740. In an embodiment, when the channel quality indicator between the access point 750 and the user equipment 740 drops below a pre-determined threshold, this may be indicative that interference is detected from other access points 760 and/or other user equipment 770 that are potentially nearby (either within the same enterprise or between two or more nearby enterprises). Furthermore, the detected interference may be used to instruct the DNA-C that the operational parameters of one or more of the access point 750, the user equipment 740, other access points 760 (if 760 controller by the same DNA-C as 750), and other user equipment 770 associated with the DNA-C may need to be re-assigned in order to reduce the detected interference and impact on the performance of each of those participants.

Figure 7B:
FIG. 7B illustrates analytics used to optimize performance for different access points in accordance with various embodiments of the subject technology.

FIG. 7B illustrates analytics used to optimize performance for different access points and user equipment devices in accordance with various embodiments of the subject technology. In particular, the table illustrated in the figure contains information about each of the access points and/or user equipment that the DNA-C can use to modify the operational parameters to minimize or remove interference between different access points and/or user equipment. The DNA-C, since it is associated with an enterprise, may be able to retrieve a variety of different types of information related to the access points and/or user equipment of the enterprise. Example data that can be retrieved by the DNA-C may include the location of each of the access points and/or user equipment in an enterprise, a current channel quality indicator, a best channel quality indicator, and a detected level of interference.

With the detected level of interference, the DNA-C may include details about where the interference is coming from. For example, the DNA-C may be able to determine if the interference is coming from other access points and/or user equipment from the same enterprise or from access points and/or user equipment from other nearby enterprises.

Figure 7C:
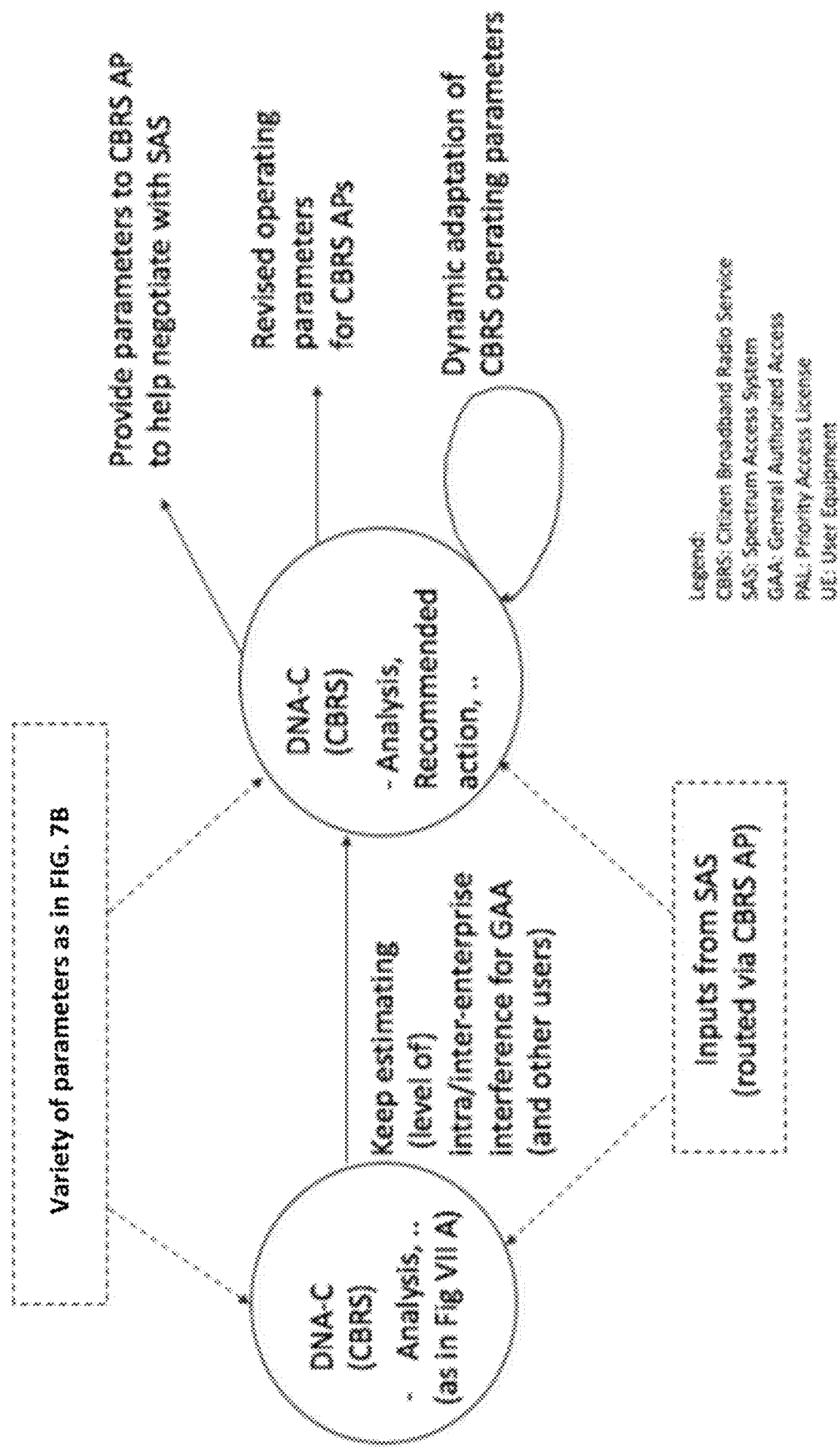
FIG. 7C illustrates a flowchart illustrating the method in accordance with various embodiments of the subject technology.

FIG. 7C illustrates a flowchart illustrating the analytics performed by the DNA-C in accordance with various embodiments of the subject technology. Each of the DNA-C may retrieve a variety of parameters associated with each of the access points and/or user equipment (as illustrated in FIG. 7B). Furthermore, the DNA-C will be provided parameters (e.g., CBRS channel, maximum effective isotropic radiated power) that each of the access points are allowed to use indirectly from the SAS. Specifically, the SAS generally defines how each of the access points would be allowed to operate (e.g., CBRS channel, maximum effective isotropic radiated power) and each of the access points would forward that information to the DNA-C.

Once the information is obtained by the DNA-C, a variety of different analytics can be performed to determine whether adjustments need to be made to one or more access points and/or user equipment. As illustrated in the figure, the DNA-C may continue estimating a level of interference present within the CBRS network (whether the interference is detected within the same enterprise or between two or more different nearby enterprises.

The DNA-C may also use machine learning to dynamically adapt the operational parameters of each access point and/or user equipment. The DNA-C, by using machine learning, can perform various calculations and iterations to identify what operational parameters can be used by an access point (within the allowed set of parameters defined by the SAS) that would reduce or remove the interference from other access points and/or user equipment. For example, re-assigning an access point to use a lower maximum effective isotropic radiated power or reduced channel bandwidth than what is allowed by SAS or a different frequency (if approved by SAS) may be capable of reducing or removing the interference caused by the other access point. The DNA-C, once it is able to identify the updated operational parameters that could be used, will then provide instructions to the affected access points and/or user equipment and modify operation of them accordingly in order to address the interference issue without violating any constraints imposed by SAS for that enterprise.

In situations where no possible changes in the operational parameters would be possible to address the interference detected within the CBRS network, the DNA-C can provide suggestions to the access point that can then be used by the access points to request for updated parameters (if possible) from the SAS. For example, if two different nearby enterprises have access points assigned to the same CBRS channel, it may be possible to have the access points inform the SAS of the current situation and request a different set of operating parameters so as to resolve the interference issue.

Figure 7D:
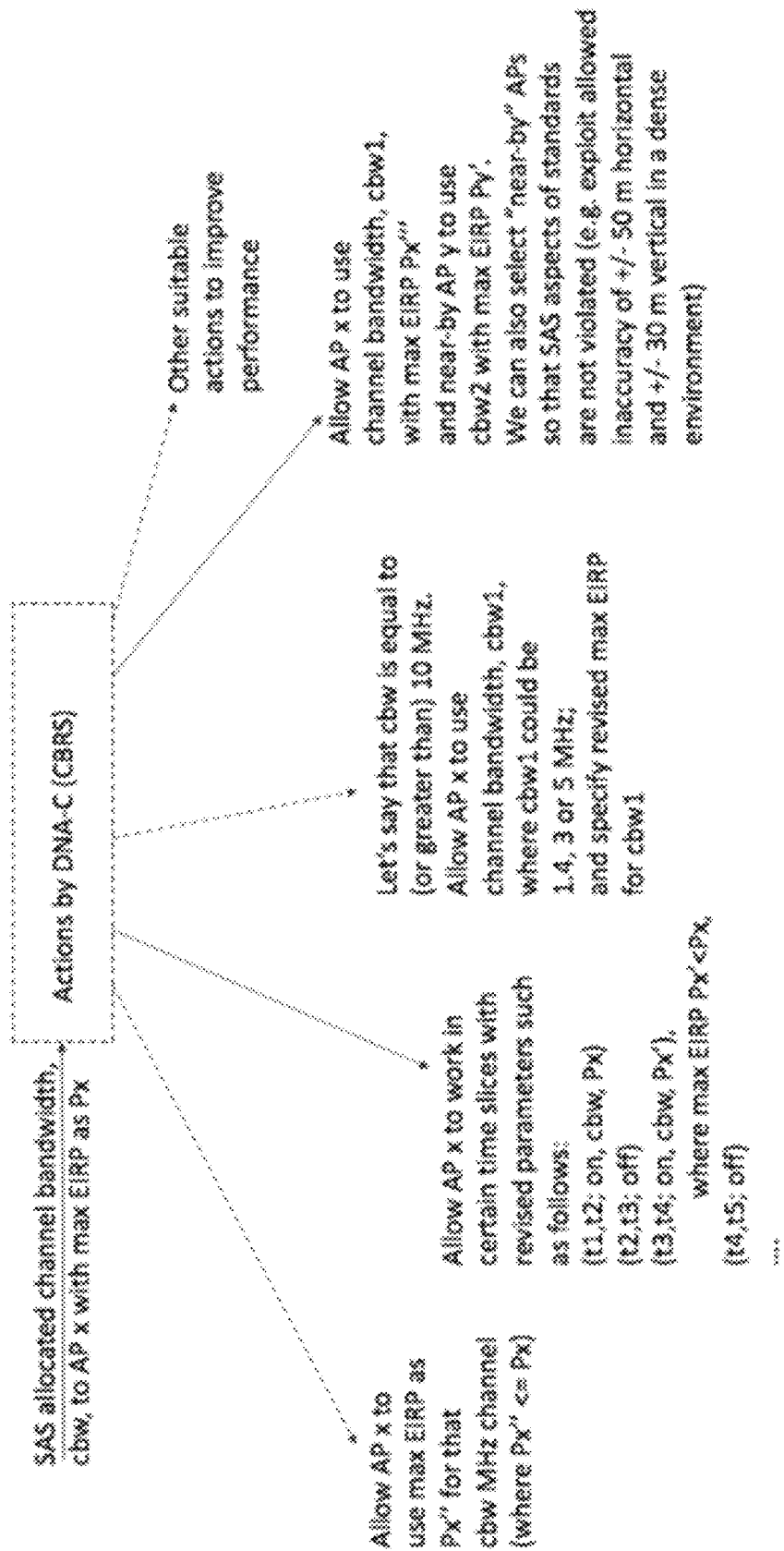
FIG. 7D illustrates actions that can be performed by the DNA-C in accordance with various embodiments of the subject technology.

FIG. 7D illustrates actions that can be performed by the DNA-C in accordance with various embodiments of the subject technology. In particular, once the DNA-C receives (from the respective access points) the allocated operational parameters that access point is able to use (e.g., CBRS channel, maximum effective isotropic radiated power) provided by the SAS, the DNA-C is then able to analyze and modify the operation of each of those access points so long as the modifications are within the constraints defined for the access points by the SAS. In an embodiment, machine learning can be used to identify the various operational parameters that can be modified and (in situations where multiple solutions are possible) can then select the one solution that provides the best improvement to the CBRS network overall.

For example, the DNA-C may identify what maximum effective isotropic radiated power is being used by the various access points and/or user equipment and modify the amount of maximum effective isotropic radiated power that each of the access point and/or user equipment can use that may be less than a max power allowed by the SAS. The DNA-C may also modify the operational parameters for the access point for periods of time (e.g., time slices). For example, if the DNA-C knows that two nearby access points within the same enterprise are causing interference with each other, the DNA-C may schedule a staggered time-based operation of the two nearby access points in a manner such that one access point is operational while another is on stand-by and vice versa. In another example, if an enterprise is assigned a broadcast band that is capable of having different access points assigned to different portions of the broadcast band, the DNA-C can assign the access points accordingly so that nearby access points do not use the same portion of the broadcast band.

There may also be other actions that the DNA-C can implement upon analyzing the operational parameters of each of the access points and/or user equipment within the CBRS network for the purposes of improving performance of the access point and user equipment. The figure merely illustrates some exemplary actions. More or fewer actions may be implemented by the DNA-C in connection with modifying the operational parameters of access points and/or user equipment to reduce or remove interference detected within the CBRS network.

Figure 8A:
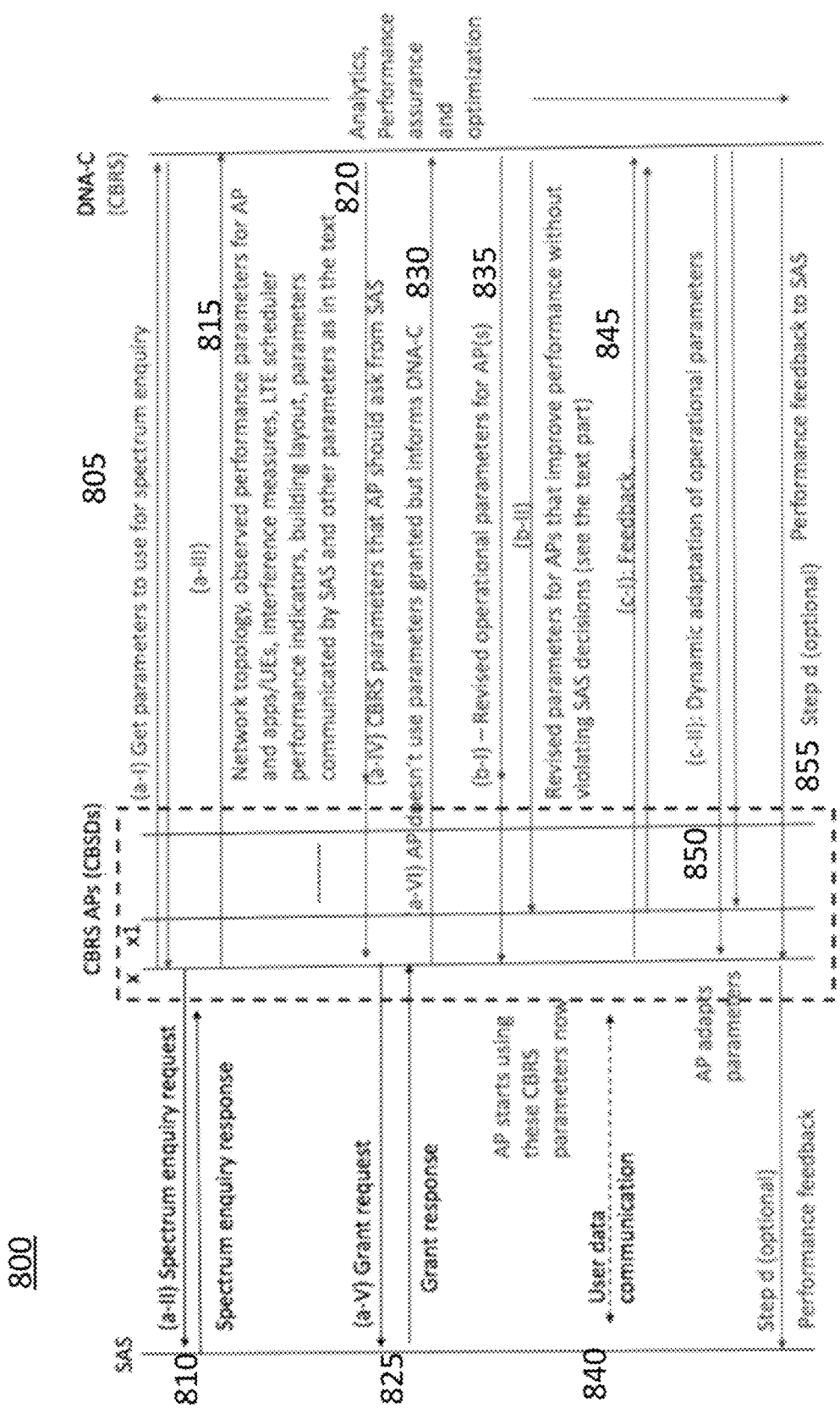
FIG. 8A illustrates a flow diagram in accordance with various embodiments of the subject technology.

FIG. 8A illustrates a flow diagram 800 in accordance with various embodiments of the subject technology. In particular, with the inclusion of the DNA-C, the flow diagram of FIG. 2 has been updated to include the steps associated with the DNA-C.

Starting with step 805, each of the access points that are to be deployed in the CBRS network may communicate with their respective DNA-C in order to inquire about what operational parameters the access point should request the SAS (via the 'spectrum enquiry request') to use. The DNA-C provides a list of various operational parameters that would be useful to the access point. This list of operational parameters is then provided by the access point to the SAS in step 810. The access point then receives a response back from the SAS regarding what operational parameters are relevant for deploying the access point within the CBRs network.

In step 815, the access point provides the various operational parameters identified in step 810 to the DNA-C. Example information provided by the access point to the DNA-C include the network topology, available channels and operating parameters associated with other access points within the same enterprise, observations related to performance of other access points and/or user equipment, detected interference, traffic load, building layout, and channel quality indicators from user equipment. It should be noted that other information about the access point can also be provided and used by the DNA-C. Furthermore, some of this information is also used by SAS in step 805 when it informs each CBRS access point for the operational parameters for which it should enquire from the SAS.

Using the information obtained from the access points, the DNA-C analyzes the information in order to determine what operational parameters that the access point should request the SAS to use. In some cases, machine learning can be used to make the determination by considering all the possible operational parameters and running simulations in order to identify the best set of operational parameters that would reduce or prevent interference from occurring with nearby access points and/or user equipment.

The determined set of operational parameters by the DNA-C are then provided to the access point in step 820. Using the determined set of operational parameters, the access point can request the SAS (in step 825) to use certain operational parameters in order to reduce or avoid interference. The SAS may, in some cases, use the information within the request in order to assign the access point specific operational parameters (e.g., CBRS channel, maximum effective isotropic radiated power for transmission on that channel) that the access point will be constrained to corresponding to the request.

In step 830, the access point provides the assignment of operational parameters from the SAS to the DNA-C. Using the constraints provided by the SAS, the DNA-C can now perform another round of calculations in order to identify a set of modifications to the operational parameters of the access point in step 835 that would reduce or avoid interference within the CBRS network. The revised operational parameters may be different from the initial suggestions provided by the DNA-C (in step 820) because the revised operational parameters would need to fall within the constraints assigned by the SAS (in step 825). For example, if the SAS requires that the access point operates within a range of frequencies, the revised operational parameter may choose to only use a portion of the range of frequencies. Similarly, if the SAS requires that the access point operates with maximum effective isotropic radiated power no greater than a pre-determined threshold, the DNA-C can instruct the access point to use a different power level below that pre-determined threshold.

In step 840, the access point uses the revised operational parameters. The communication associated with the access point may be monitored by the SAS to ensure that they fall within the constraints assigned by the SAS.

In step 850, DNA-C can continually monitor the CBRS network and update the operational parameters based on the current state of the CBRS network. For example, if the user equipment detects more or less interference at a given point in time, the DNA-C may adapt the operational parameters in order to account for the change in interference. In this way, the access points can continually be modified in order to adapt to a changing CBRS network as more or less access points and/or user equipment enter and leave the CBRS network.

In step 855, an optional/alternative method of adapting the access point is also described. In particular, performance feedback can also be used in connection with the access point to determine whether the operational parameters of the access point need to be modified. For example, if a user associated with user equipment associated with the access point provides feedback that the quality of communication has become poor, the feedback may be used to identify that interference issues may be present at the access point and that the operational parameters of the access point and/or user equipment may need to be modified to address the interference.

Figure 8B:
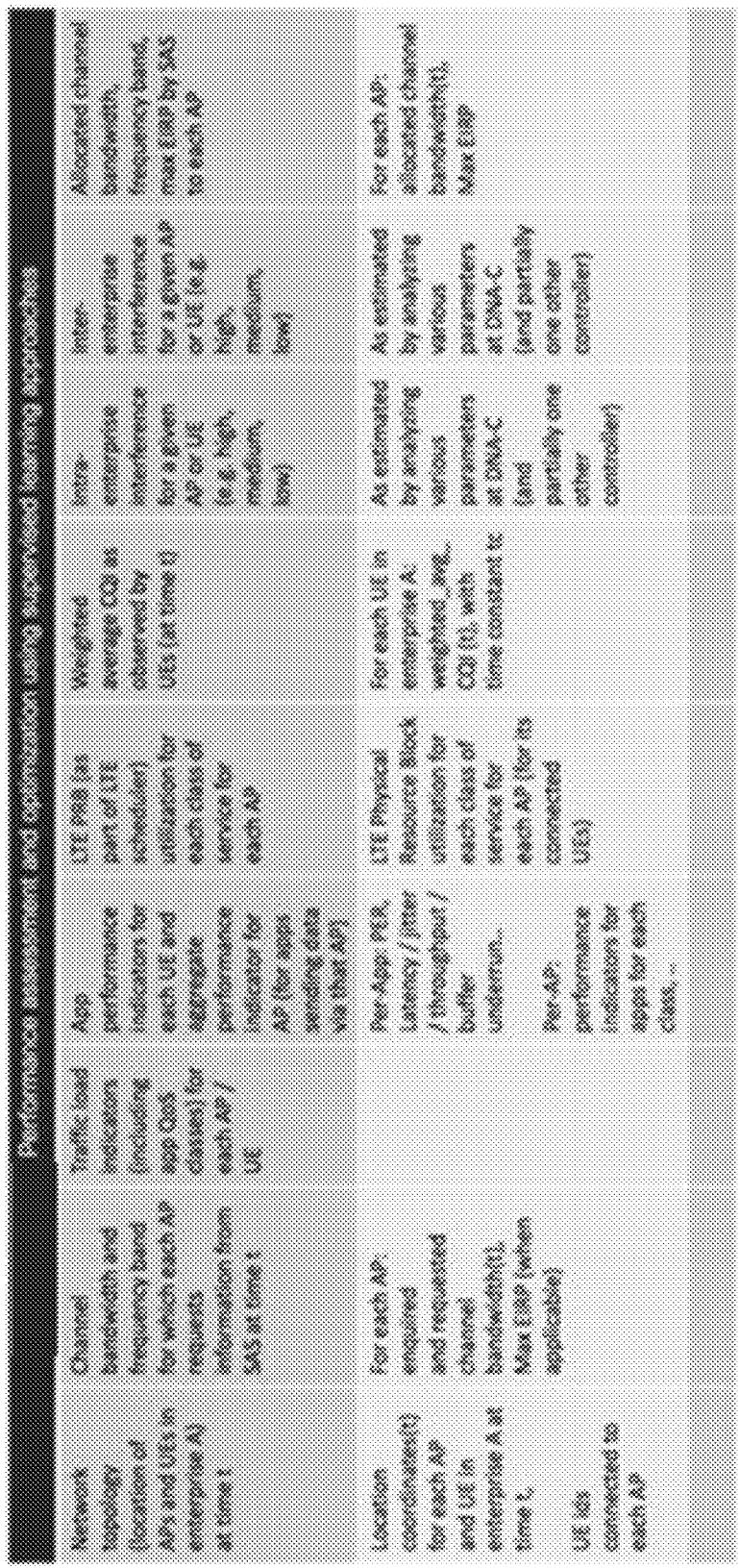
FIG. 8B illustrates learning approaches for assessing and optimizing the CBRS network in accordance with various embodiments of the subject technology.

FIG. 8B illustrates learning approaches for assessing and optimizing the CBRS network in accordance with various embodiments of the subject technology. In particular, the table highlights example parameters that are considered and used in connection with the machine learned models of the DNA-C. The machine learned models would be used by the DNA-C to identify what operational parameters should be used with the access point and the user equipment.

For example, the machine learned model may consider and use the following operational parameters: 1) frequency band that the access point can use at a particular time, 2) available channel and maximum effective isotropic radiated power that the access point can use as assigned by the SAS at the particular time, 3) location coordinates of user equipment, weighted average of the channel quality indicator at the particular time, the associated access point (based on the access point identification and location), and observed quality of service parameters, and 4) performance parameters for the access point such as traffic load per class of quality of service, interference measure, number of application of high priority quality of service classes that are not able to meet critical performance parameters, and scheduling of resources.

As new access points are added to the CBRS network or as network conditions associated with the CBRS network change (e.g., traffic load) change for access points already deployed, the machine learned models will evaluate the various operational parameters in order to predict what operational parameters should be used. For example, the machine learned model will predict what channel bandwidth and maximum effective isotropic radiated power the SAS may assign to the access point, a level of interference that a user equipment may experience in the CBRS network, and an impact on performance of the user equipment because of the level of interference.

Figure 9:
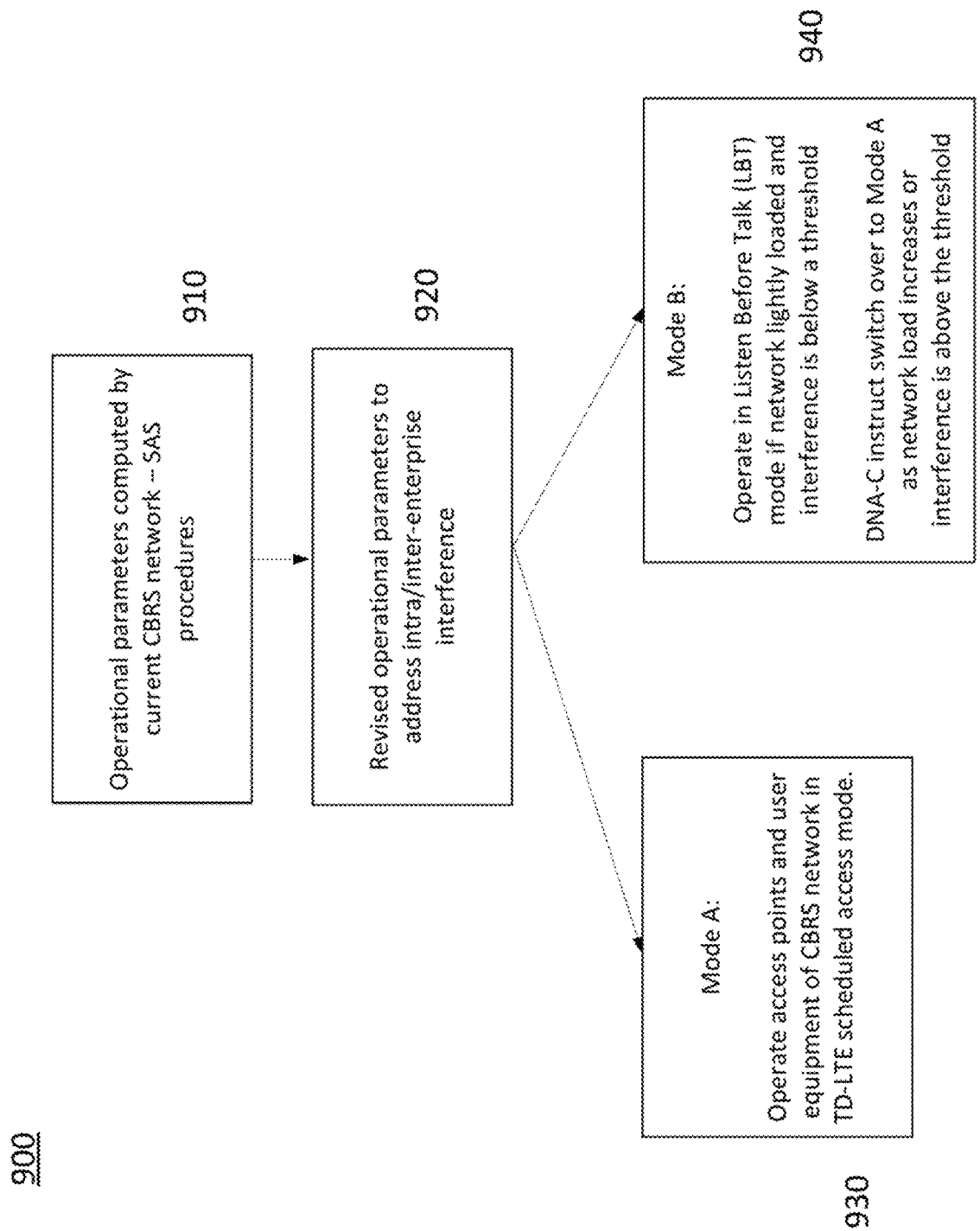
FIG. 9 illustrates a flowchart for operating the CBRS network via two different modes in accordance with various embodiments of the subject technology.

FIG. 9 illustrates a flowchart 900 for operating the CBRS network via two different modes in accordance with various embodiments of the subject technology. In particular, steps 910 and 920 pertain to the disclosure above in connection with the operational parameters assigned by the SAS and the revised operational parameters determined by the DNA-C for the access points within the CBRS network, respectively.

In step 930, mode A corresponds to the mode whereby the access points and user equipment of the CBRS network are operated in a TD-LTE scheduled access mode. In other words, the access points and/or user equipment may only communicate at scheduled periods of time. The scheduling is set so that interference from other access points and user equipment using the same CBRS channels can be minimized.

In contrast, step 940 corresponds to mode B which allows the operation of the access points and user equipment in a "Listen Before Talk" (LBT) mode. Here the access points and user equipment may first monitor to see if any other access points or user equipment is currently using the same assigned broadcast band or frequency. So long as the broadcast band or frequency is not in use, the access point and user equipment may operate normally. However, if the broadcast band or frequency is currently in use, the access point and user equipment may need to wait and follow other LBT related constraints until the broadcast band frees up.

The use of the LBT mode may be desired when the network is lightly loaded (i.e., the different channels of communication are not heavily used by the various access points within the CBRS network) or a detected interference is below a pre-determined threshold. This would allow an access point and associated user equipment to communicate without much interference from other access points and user equipment as the likelihood of two access points using the same broadcast band or frequency at the same time is not significant. However, if the network load increases (or alternatively if the interference becomes greater than the pre-determined threshold), the DNA-C may instruct the CBRS network to operate in Mode A (e.g., scheduling each of the access points and user equipment as to when they can communicate).

Figure 10:
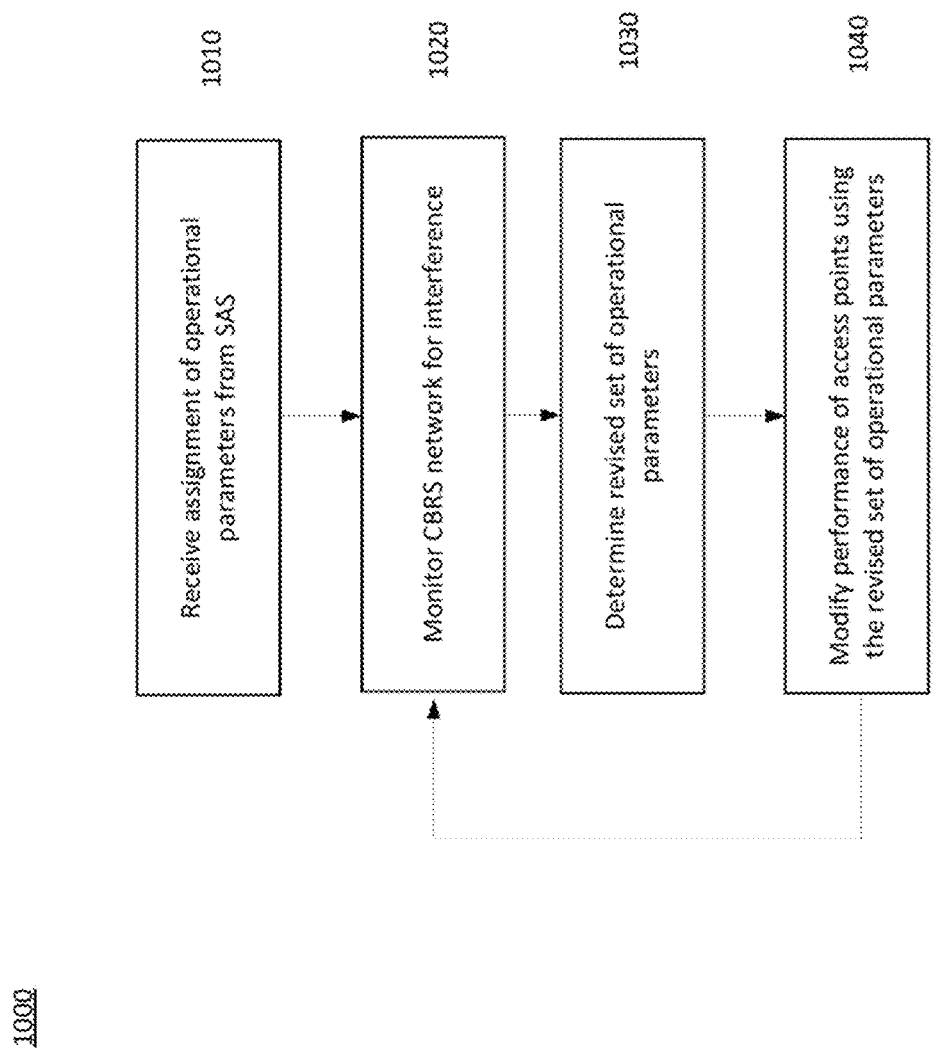
FIG. 10 illustrates another method in accordance with various embodiments of the subject technology.

FIG. 10 illustrates a method 1000 in accordance with various embodiments of the subject technology. The method 1000 dynamically assigns access points and/or user equipment of a CBRS network different operational parameters to reduce or remove the effects of interference from other nearby access points and/or user equipment.

In step 1010, each of the access points may receive assigned operational parameters from the SAS. The assignments from the SAS define operational constraints that the access point would need to satisfy when using the CBRS network. Example operational constraints may include a particular CBRS channel and maximum effective isotropic radiated power. In one scenario, the SAS may assign an access point to a particular CBRS channel to use for communication. That would mean that the access point is required to only use that assigned CBRS channel (and no other channel in the CBRS spectrum). In another scenario, the SAS may require that the access point operate at power levels below a pre-determined threshold. The threshold would identify the highest possible maximum effective isotropic radiated power level that the access point could use.

In step 1020, the CBRS network may be monitored for interference. For example, the user equipment may calculate channel quality indicators that quantify quality of performance for communicating with the access point. Based on the current quality and/or change in quality, interference can be detected.

In step 1030, the DNA-C of the CBRS network can be used to identify what operational parameters could be used by the access point and/or user equipment in order to reduce interference (as detected in step 1020). The DNA-C may utilize machine learning in order to evaluate the possible operational parameters and the constraints on those parameters assigned by the SAS in order to find a revised set of operational parameters that would carry out the reduction in interference with respect to other access points or user equipment.

In step 1040, the revised set of operational parameters identified by the DNA-C can be forwarded to the access point and/or user equipment. The access point and/or user equipment will use the revised set of operational parameters in order to modify performance within the CBRS network and reduce interference.

Once the modification has been completed, the user equipment can continue monitoring for interference (returning to step 1020). The method 1000 can continually loop from 1020-1040 in order to continually adapt to the changing state of the CBRS network (as new access point and/or user equipment become deployed nearby the access point in question). In some embodiments, user feedback regarding quality of performance can be detected in order to identify when modification to the current set of operational parameters need to be performed to address interference issues.

Figure 11:
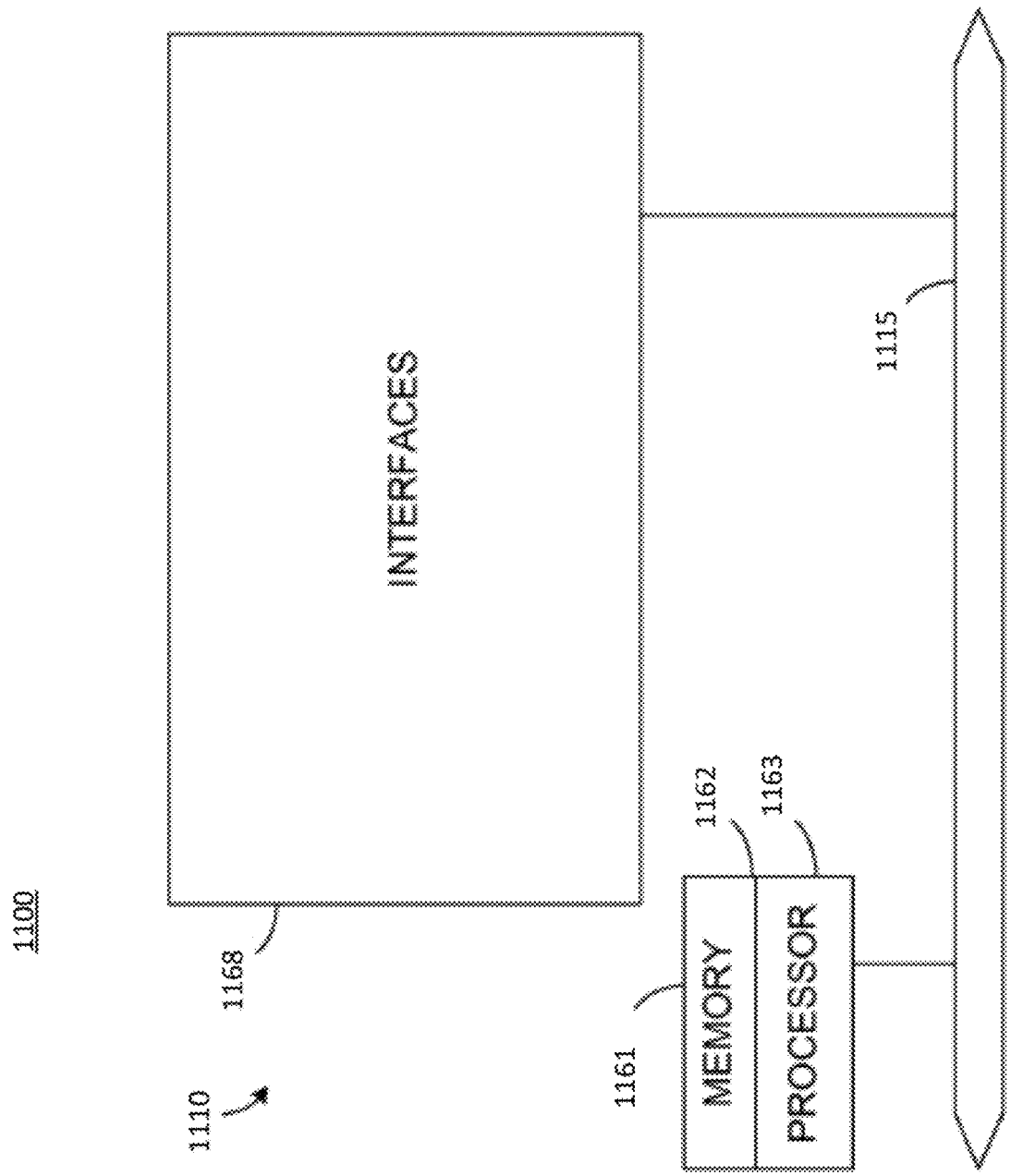
FIG. 11 illustrates an exemplary network device in accordance with various embodiments of the subject technology.

FIG. 11 illustrates an exemplary network device 1110 in accordance with various embodiments of the subject technology. Network device 1110 includes a master central processing unit (CPU) 1162, interfaces 1168, and a bus 1115 (e.g., a PCI bus). When acting under the control of appropriate software or firmware, the CPU 1162 is responsible for performing the steps, for example, illustrated in FIG. 10. The CPU 1162 preferably accomplishes all these functions under the control of software including an operating system and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of the network device 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 11 is one specific network device of the present embodiments, it is by no means the only network device architecture on which the present embodiments can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 12:
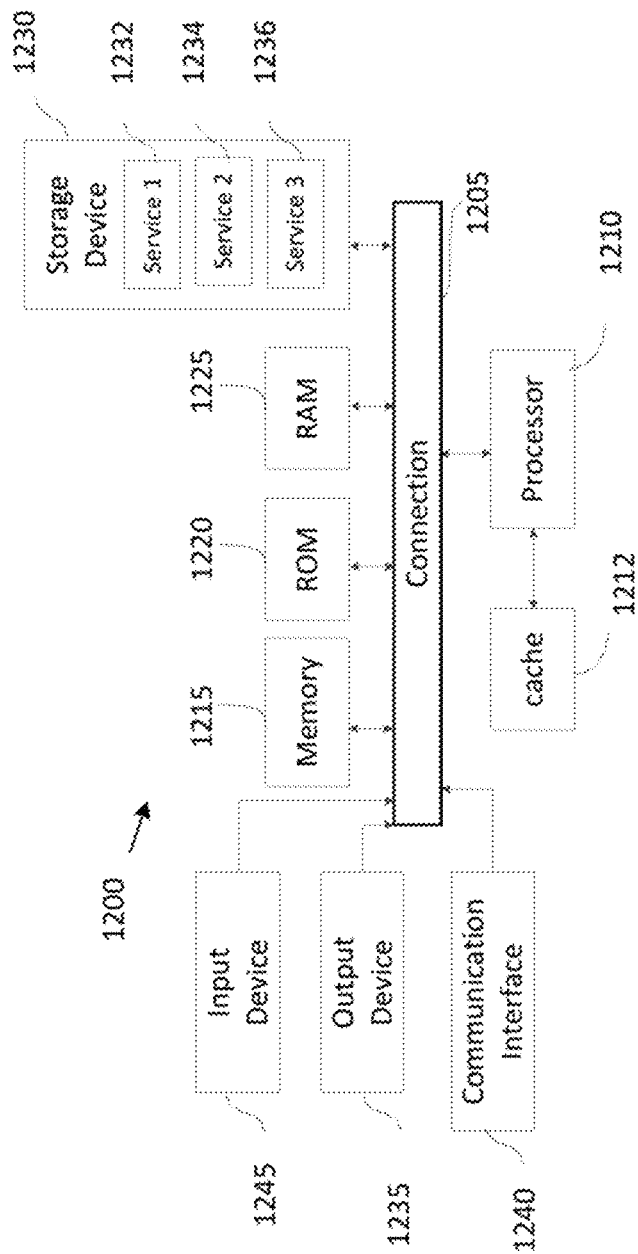
FIG. 12 shows an example computing system in accordance with various embodiments of the subject technology.

FIG. 12 shows an example computing system 1200 in accordance with various embodiments of the subject technology. The example computing device can correspond to the computing devices associated with the access point, user equipment, and/or DNA-C illustrated in FIG. 3. Furthermore, the example computing device may also make up any component thereof in which the components of the system are in communication with each other using connection 1205. Connection 1205 can be a physical connection via a bus, or a direct connection into processor 1210, such as in a chipset architecture. Connection 1205 can also be a virtual connection, networked connection, or logical connection.

In some embodiments computing system 1200 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read only memory (ROM) 1220 and random access memory (RAM) 1225 to processor 1210. Computing system 1200 can include a cache of high-speed memory 1212 connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement and therefore the basic features here may easily be substituted for improved hardware or firmware arrangements as they are developed.

Storage device 1230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
assigning a set of operational parameters for a first access point of a first service provider of a first wireless network, wherein the set of operational parameters define operational constraints for the first access point and its associated user equipment within the wireless network, the operational constraints being specific to a tier of the wireless network in which the associated user equipment is assigned;
detecting interference between the first access point and a device associated with a second wireless network of a second service provider; and
revising the set of operational parameters for the first access point based on the detected interference to generate a revised set of operational parameters which will reduce interference between the first access point of the device while maintaining the first access point in the assigned tier.

2. The method of claim 1, wherein the device associated with the second wireless network is a second access point for providing access to the second wireless network.

3. The method of claim 1, wherein the set of operational parameters include a specific wireless channel for use by the first access point in providing network service access and a maximum effective isotropic radiated power (EIRP) that the first access point can use for the specific wireless channel.

4. The method of claim 1, wherein the operational constraints are defined based on information provided by both the first service provider and the second service provider.

5. The method of claim 4, wherein the information includes information regarding network access provided by two different enterprises associated with one of the first wireless network and the second wireless network.

6. The method of claim 1, wherein the wireless network is the Citizen Broadcast Radio Service and the tier is a tier of the Citizen Broadcast Radio Service.

7. The method of claim 1, wherein the tier is an incumbent access tier, priority access tier, or general authorized access tier of Citizen Broadcast Radio Service.

8. A system comprising:
one or more processors; and
a computer-readable medium comprising instructions stored therein, which when executed by the one or more processors, cause the one or more processors to:
assign a set of operational parameters for a first access point of a first service provider of a first wireless network, wherein the set of operational parameters define operational constraints for the first access point and its associated user equipment within the wireless network, the operational constraints being specific to a tier of the wireless network in which the associated user equipment is assigned;

detect interference between the first access point and a device associated with a second wireless network of a second service provider; and revise the set of operational parameters for the first access point based on the detected interference to generate a revised set of operational parameters which will reduce interference between the first access point of the device while maintaining the first access point in the assigned tier.

9. The system of claim 8, wherein the device associated with the second wireless network is a second access point for providing access to the second wireless network.

10. The system of claim 8, wherein the set of operational parameters include a specific wireless channel for use by the first access point in providing network service access and a maximum effective isotropic radiated power (EIRP) that the first access point can use for the specific wireless channel.

11. The system of claim 8, wherein the operational constraints are defined based on information provided by both the first service provider and the second service provider.

12. The system of claim 11, wherein the information includes information regarding network access provided by two different enterprises associated with one of the first wireless network and the second wireless network.

13. The system of claim 8, wherein the wireless network is the Citizen Broadcast Radio Service and the tier is a tier of the Citizen Broadcast Radio Service.

14. The system of claim 8, wherein the tier is an incumbent access tier, priority access tier, or general authorized access tier of Citizen Broadcast Radio Service.

15. A non-transitory computer-readable storage medium comprising instructions stored therein, which when executed by one or more processors, cause the one or more processors to perform operations comprising:

assigning a set of operational parameters for a first access point of a first service provider of a first wireless network, wherein the set of operational parameters define operational constraints for the first access point and its associated user equipment within the wireless network, the operational constraints being specific to a tier of the wireless network in which the associated user equipment is assigned;

detecting interference between the first access point and a device associated with a second wireless network of a second service provider; and revising the set of operational parameters for the first access point based on the detected interference to generate a revised set of operational parameters which will reduce interference between the first access point of the device while maintaining the first access point in the assigned tier.

16. The non-transitory computer-readable storage medium of claim 15, (Original) wherein the device associated with the second wireless network is a second access point for providing access to the second wireless network.

17. The non-transitory computer-readable storage medium of claim 15, wherein the set of operational parameters include a specific wireless channel for use by the first access point in providing network service access and a maximum effective isotropic radiated power (EIRP) that the first access point can use for the specific wireless channel.

18. The non-transitory computer-readable storage medium of claim 15, wherein the operational constraints are defined based on information provided by both the first service provider and the second service provider.

19. The non-transitory computer-readable storage medium of claim 15, wherein the wireless network is the Citizen Broadcast Radio Service and the tier is a tier of the Citizen Broadcast Radio Service.

20. The non-transitory computer-readable storage medium of claim 15, wherein the tier is an incumbent access tier, priority access tier, or general authorized access tier of Citizen Broadcast Radio Service.

* * * * *